United States Patent Office 3,582,364
Patented June 1, 1971

3,582,364
SAUSAGE CASING WITH IMPROVED
RELEASE COATING
Henry J. Rose and Albin F. Turbak, Danville, Ill.,
assignors to Tee-Pak, Inc.
Filed May 8, 1968, Ser. No. 727,446
Int. Cl. A22c 13/00; C08h 9/00
U.S. Cl. 99—176    17 Claims

ABSTRACT OF THE DISCLOSURE

The inside surface of gel cellulosic or other sausage casing is contacted with an aqueous emulsion containing (A) a hydrophobic material with a reactive functional group, such as either a dimer of a fatty ketene, a fatty isocyanate, an N-fatty-imine or a fatty chromium complex, (B) a water-insoluble, monomeric fatty material with a polar end group and having an HLB number from 1 to 10, e.g. a fatty alcohol, fatty amine, fatty acid, fatty amide or fatty ester, and (C) an at least partially water-soluble surfactant having an HLB number greater than 7 and giving a surface tension less than 50 dynes/cm.$^2$ at 0.2% concentration in water, e.g. a propylene oxide or ethylene oxide ether adduct. In (A), (B) and (C), the fatty substituents are preferably of about the same chain length. The three ingredients of the emulsion are usually modified with a buffer such as sodium bicarbonate to adjust and maintain the pH and are so proportioned and chosen such that coating produced on the inner surface of the casing has a contact angle for droplets of water of about 70°–90° and a contact angle for oils of about 40°–70°. The surface properties of the meat-contacting side of the coated casing, after drying, are thereby modified so that the casing can be easily stripped from the sausage which is encased there in and yet does not tend to cause the sausage to fat out.

BACKGROUND OF THE INVENTION

Field of the invention

This invention relates to new and useful improvements in the production of sausages in which a cellulosic sausage casing is coated internally with a material which permits ease of removal of the casing from the finished sausage and prevents the development of masses of fat adjacent to the surface of the casing.

There has been considerable consumer acceptance of pre-sliced sausages, such as bologna, salami, etc., which are sold in the form of relatively small, conveniently sized packages, each package containing, as an example, a small predetermined quantity of sausage in the form of a fixed number of slices. The rapid increase in popularity and volume of such packaged sausage has, however, been accompanied by a number of difficulties and problems on the part of the meat packer. For example, in order to provide a predetermined number of slices of sausage in a package of given weight, it is essential that the processing of the sausage be such that the density, diameter, and other physical dimensions, as well as the surface appearance of the sausage, be carefully controlled. The reason for this is that the slicing is performed mechanically, and in high speed packaging it is essential that the dimensional variations of the sausage be held to an absolute minimum. In the preparation of sausages by the meat packer, a sausage emulsion is inserted into a casing which is known in the trade as fibrous casing. Fibrous casing is composed of cellulosic fibers, preferably in the form of a paper, which are impregnated and held together by regenerated cellulose. In the formation of sausages by filling fibrous casings with a sausage emulsion, one of the great problems which has arisen is the tendency of the sausage emulsion to stick or adhere to the inside surface of the casing within which it is contained.

Many attempts have been made to solve the problem of meat sticking to the casing in the preparation of sausage, but no completely satisfactory solution has been found. In the past, suggestions have been made to coat the interior of the casing with fatty or waxy materials of one kind or another prior to stuffing with sausage emulsion. While this procedure does provide some relief from the problem, the problem has not been solved completely since there is still too much adhesion of meat to the casing. In addition, some of the materials which have been used have been of questionable toxicity or have had a tendency to impart undesirable odors, flavors or colors either to the casing or to the meat product within it. Furthermore, the use of wax and waxy materials as suggested in the past frequently was found to have had a deleterious effect on the necessary permeability of the casing to moisture vapor, smoke, drying, and the like. It should be noted that this problem of adhesion of the casing to the meat does not involve merely aesthetics but that substantial losses of materials are involved. When casing is stripped from a bologna prior to slicing, it often contains a substantial and expensive amount of sausage which adheres to the inside of the casing and which is lost as waste which is thrown away with the stripped off casing. A further factor is that when the surface of the stripped sausage is too eroded, it cannot be sold and often must be reworked into a batch of sausage emulsion. Such reworking involves not only additional cost, but may result in an inferior finished product.

Description of the prior art

In U.S. Pat. 3,106,471, a method is disclosed in which a cellulosic casing is coated with a dimer of a higher organic (e.g. fatty) ketene which becomes chemically bound to the surface of the casing. The casing which is produced by this process does not adhere to the sausage emulsion encased therein and after processing can be readily peeled off from the encased sausage without damaging the meat surface. After extensive commerical use of the aforementioned invention, it was found that the coating of the sausage casing with a diketene solved the problem of adhesion of the casing to the sausage emulsion during processing but was the source of an unsuspected problem of a substantially different nature. Over a period of time in the commerical utilization of the aforementioned invention, it was found that sausages which were prepared using casings coated on the inner surface with a diketene frequently tended to form masses of unsightly fatty material at the surface of the sausage adjacent to the casing, particularly with fatty sausage emulsions and excessive temperatures in processing. This phenomenon is referred to in the meat packing industry as fatting out. When sausages were prepared using casings coated on the inner surface with a diketene, it was found at times that large masses of fat formed between the surface of the sausage and the casing. In some cases, these masses of fat were evenly distributed around the sausage as a fatty layer while in other cases the fat formed in thick isolated masses. In either case, the product was unsightly and considerably reduced in value if it were salable at all.

In U.S. Pat. 3,158,492, a process is disclosed in which a cellulosic casing is coated with an aqeuous emulsion containing as essential ingredients a dimer of a higher ketene and a lower alkyl cellulose. The incorporation of a lower alkyl cellulose into the diketene-coating composition modifies the surface properties of the coated casing so that the casing can be easily stripped from the sausage which is encased therein and yet does not generally tend to cause the sausage to fat out appreciably. Specifically, some fatting out of the sausage still occurs despite the incorporation of a lower alkyl cellulose into the diketene-coating composition. Furthermore, the process is lacking in control and occasionally leads to excessive fatting out. Attempts at dilution of the coating emulsion have led to an equally undesirable mottled appearance of the sausage.

In U.S. Pat. 2,709,138, a method is disclosed for preventing the adhesion of cellulosic sausage casing to the sausage by treating the inside of the casing with stearyl isocyanate or N-stearyl-ethylenimine. However, sausages produced in this casing tend to fat out due to the fat repellent properties of the coated surface.

In U.S. Pat. 2,901,358, a method is described for producing an artificial meat casing easily peelable from the sausage or meat mass encased therein by coating the inside of the casing with stearato chromic chloride. Again, sausages produced in such casing tend to fat out due to the fat repellent properties of the coated surface.

From a theoretical viewpoint, fatting-out is the separation of the oil or fatty phase at the surface of the casing in the form of nonwetting droplets which coalesce to form visible fat areas adjacent to the surface. This can occur if the meat-contacting surface of the sausage casing is repellent both to aqueous and fatty phases of the meat emulsion. To avoid this, it is desirable that the oily phase wet-out selectively and uniformly. Excessive wetting of the casing surface by oils is equally undesirable because it gives a mottled appearance. It is, therefore, very important to produce a meat-contacting surface in the casing which has a proper balance of hydrophobic and oleophobic properties.

STATEMENT OF OBJECTS AND FEATURES OF THE INVENTION

Accordingly, it is an object of this invention to provide a sausage casing which can be easily stripped from the sausage which is encased therein and yet does not cause the sausage to fat out or become mottled.

Another object of this invention is to provide a method for preparing sausages in which the casing is coated with a composition which modifies the properties of the coated casing so that the casing can be easily stripped from the sausage which is encased therein and yet does not tend to cause the sausage to fat out or become mottled.

Still another object of this invention is to provide a method for treating a sausage casing which can be easily stripped from the sausage meat and does not cause the sausage to fat out or become mottled, which method employs a coating of the inner surface with a Food and Drug approved coating composition.

A feature of this invention is the coating of the inside surface of a synthetic sausage casing with an aqueous emulsion containing (A) a hydrophobic material such as a dimer of a fatty ketene, a fatty isocyanate, an N-fatty-imine or a fatty chromium complex, (B) a water-insoluble, monomeric fatty material with a polar end group and having an HLB number from 1 to 10, and (C) an at least partially water-soluble surfactant having an HLB number greater than 7 and giving a surface tension less than 50 dynes/cm.$^2$ at 0.2% concentration in water, followed by the drying of the coating.

Another feature of this invention is a sausage casing having the meat-contacting surface thereof coated with a composition containing (A) a hydrophobic material such as a dimer of a fatty ketene, a fatty isocyanate, an N-fatty-imine or a fatty chromium complex, (B) a water-insoluble, monomeric fatty material with a polar end group and having an HLB number from 1 to 10, and (C) an at least partially water-soluble surfactant having an HLB number greater than 7 and giving a surface tension less than 50 dynes/cm.$^2$ at 0.2% concentration in water, with (A) (B) and (C) proportioned such that the contact angle for droplets of water on said meat-contacting surface is from about 70°–90° and the contact angle for oils is from about 40°–70°, with the fatty components of (A), (B) and (C) preferably being of approximately the same length.

Other objects and features of this invention will become apparent from time to time throughout the specification and claims as hereinafter related.

SUMMARY OF THE INVENTION

In accordance with this invention, it has been discovered that the properties of cellulosic or other synthetic sausage casing may be modified by treating the meat-contacting surface thereof with an aqueous emulsion containing (A) a hydrophobic material having a functional group reactive with the surface being coated, such as either a dimer of a higher ketene, fatty isocyanate, N-fatty-imine or fatty chromium complex, (B) a water-insoluble, monomeric fatty material with a polar end group and having an HLB number from 1 to 10, e.g. a fatty alcohol, fatty imine, fatty acid, fatty amide or fatty ester, and (C) an at least partially water-soluble surfactant having an HLB number greater than 7 and giving a surface tension less than 50 dynes/cm.$^2$ at 0.2% concentration in water, e.g. a polyoxyethylene or polyoxypropylene type surfactant. In (A), (B) and (C), the fatty substituents are preferably of about the same chain length. The three ingredients of the emulsion are usually modified with a buffer such as sodium bicarbonate to adjust and maintain the pH and are so proportioned and chosen such that the contact angle on the inner (coated) surface of the casing for droplets of water is about 70°–90° and the contact angle for oils is about 40°–70°. The properties of the meat-contacting side of the coated casing subsequent to drying are thereby modified so that the casing can be easily stripped from the sausage which is encased therein and yet does not tend to cause fatting out or mottling.

BRIEF DESCRIPTION OF THE DRAWING

In the accompanying drawing, there is shown a preferred method of carrying out this invention, in which drawing, the single figure is a diagrammatic view showing the internal coating of casing in accordance with the method of this invention.

DESCRIPTION OF THE PREFERRED EMBODIMENTS

Sausage (or meat) casings can be produced which do not adhere to the sausage emulsion encased therein and which after processing can be readily peeled off from the encased sausage without damaging the meat surface and without the occurrence of fatting out or mottling. This is achieved, in accordance with this invention, if the meat-contacting or inside surface of the cellulosic or other synthetic sausage casing (or if the sausage casing is made by forming sheet material into a tube, then the surface of the sheet which will become the meat-contacting surface) is coated with an adherent coating material producing the desired release properties. The coating must have a carefully selected balance of hydrophobic and oleophobic properties to provide adequate release from sausage meat without also producing fatting out or motting. If the coating has a high wet-out angle, viz greater than 70°, for water droplets, the casing will peel readily from sausage meat. However, if the coating has too high a wet-out angle for oil droplets, viz. greater than 70°, fatting out will occur while too low a wet-out angle for oil droplets, viz less than about 30°, tends to result in mottling.

A suitable coating composition comprises an aqueous emulsion containing (A) a hydrophobic material having a reactive functional group, such as a dimer of a higher ketene, a fatty isocyanate, an N-fatty-imine or a fatty chromium complex (or other Werner complex), (B) a water-insoluble, monomeric fatty material with a polar end group and having an HLB number from 1 to 10, e.g. a fatty alcohol, fatty amine, fatty acid, fatty amide or fatty ester, and (C) an at least partially water-soluble fatty surfactant having an HLB number greater than 7 and giving a surface tension less tahn 50 dynes/cm.$^2$ at 0.2% concentration in water, e.g. a polyoxyethylene or polyoxypropylene type surfactant. In (A), (B) and (C), the fatty substituents are preferably of about the same chain length. The three ingredients of the coating composition are non-toxic. The three ingredients of the emulsion are usually modified with a buffer such as sodium bicarbonate to adjust and maintain the pH and are so proportioned and chosen such that the contact angle for droplets of water on the inner surface of the casing is about 70°–90° (preferably 80°–90°) and the contact angle for oil droplets is about 40°–70° (preferably 40°–60°).

INGREDIENTS OF COATING COMPOSITION

The coating composition set forth above contains (A) a hydrophobic material, (B) a water-insoluble, monomeric fatty material with a polar end group and having an HLB number from 1 to 10, and (C) an at least partially water-soluble surfactant having an HLB number greater than 7 and giving a surface tension less than 50 dynes/cm.$^2$ at 0.2% concentration in water, buffered to a pH of 3–9 suitable for stability of ingredient (A) (e.g. about pH 6–9 for a ketene dimer, fatty isocyanate, or fatty imine, or pH 3–6 for a fatty chromium complex).

Ingredient A

The hydrophobic material may be a dimer of a fatty ketene, a katty isocyanate, an N-fatty-imine or fatty chromium (or similar metal) complex, having a reactive functional group capable of reacting with and adhering to the surface of the casing.

The ketenes which are preferably used in the aqueous emulsion are diketenes of the emperical formula $$\left[ \begin{array}{c} R' \\ \phantom{R}\diagdown \\ \phantom{R}\phantom{\diagdown} C{=}C{=}O \\ \phantom{R}\diagup \\ R'' \end{array} \right]_2$$

where R' and R'' are selected from the group consisting of hydrogen and $C_8$–$C_{26}$ alkyl, aryl, and cycloalkyl radicals, not more than one of the groups R' and R'' being hydrogen. These ketenes are generally prepared from naturally occurring fatty acids, and the total number of carbon atoms and subsidiary groups corresponds to the skeleton of the acid from which the ketene was derived. In general, it is preferred to use ketenes (diketenes) which are solid at ordinary temperatures. Greatly preferred are diketenes where R' is $C_{12}$–$C_{18}$. Such compounds and their production are described further in detail in U.S. Pat. 2,762,270, and emulsions of said ketenes are described in U.S. Pat. 2,856,310. In particular, hexyl ketene dimer, decyl ketene dimer, hexadecyl ketene dimer, hexadecenyl ketene, a fatty isocyanate, an N-fatty-imine or fatty chrodimer, octadecyl ketene dimer, dimers of mixtures of ketenes obtainable from fats, oils, and the like, as well as dimers of monomeric, monoalkyl, and monoaryl ketenes, dialkyl ketenes, diaryl ketenes, cycloalkyl ketenes, and dicycloalkyl ketenes, and the like, including, for example, phenyl ketene, dioctyl ketene, tolyl ketene, decyl phenyl ketene, cyclohexyl ketene, benzyl ketene, and their dimers may be employed.

Comemrcially available ketenes which are especially useful in the coating of sausage casings are diketenes sold under the trademark Aquapel which are alkyl ketene dimers or mixtures thereof.

Hydrophobic materials other than a dimer of a fatty ketene which combine chemically or absorptively with the interior wall of the sausage casing may also be employed instead of the ketene dimer in the aqueous coating emulsion. Substances particularly useful for this purpose are those which render the interior wall of the casing hydrophobic to the desired degree. Especially advantageous are isocyanates or ethylenimines containing a hydrophobic radical such as a fatty acid residue. Stearyl isocyanate and N-stearyl-ethylenimine are greatly preferred although, in general, fatty isocyanates and N-fatty-ethylenimines derived from $C_8$–$C_{26}$ fatty acids, preferably $C_{12}$–$C_{18}$ fatty acids, may be employed.

Still other substances especially advantageous for use in place of a dimer of a higher ketene are water-soluble fatty chromium Werner complexes such as stearato chromic chloride. In general, any fatty chromium complex, preferably a fatty chromium chloride complex, derived from $C_8$–$C_{26}$ fatty acids, preferably $C_{12}$–$C_{18}$ fatty acids, may be employed. However, the stearato chromic chloride version is greatly preferred. If desired, aluminum, copper or zirconium Werner complexes may be employed instead of chromium Werner complexes.

Ingredient B

The water-insoluble, monomeric fatty material with a polar end group and having an HLB number from 1 to 10 may be a fatty alcohol, fatty amine, fatty amide, fatty acid, fatty ester, etc., the fatty substituent ranging from $C_8$–$C_{26}$, preferably $C_{12}$–$C_{18}$.

Fatty alcohols useful in the method of this invention include $C_8$–$C_2$, preferably $C_{12}$–$C_{18}$, alcohols. Cetyl alcohol is preferred. It has a melting point of 49.6° C. and is molten during the drying of the coating.

Fatty amines which can be used include those of the formula $R^1NR^2R^3$, where $R^1$ is a $C_8$–$C_{26}$ saturated or unsaturated aliphatic group, and $R^2$ and $R^3$ are hydrogen or $C_1$–$C_{26}$ hydrocarbon groups. Satisfactory amines are those with an HLB number of 1 to 10.

Fatty acids and amides which may be used include $C_8$–$C_{26}$ fatty acids and fatty amides, either straight chain or branched chain, saturated or unsaturated. The acids and amides which are satisfactory have an HLB number of 1 to 10.

Fatty esters may be used in which the fatty substituent, $C_8$–$C_{28}$ aliphatic, is present in either portion of the molecule. Esters of the formula $R^1COOR^2$, where at least one of the groups $R^1$ and $R^2$ is $C_8$–$C_{26}$ aliphatic, and having an HLB number of 1 to 10, may be used. Partial fatty esters of glycerol and acetylated fatty esters of glycerol, sold commercially as the Myverols and Myvacets, respectively, are particularly useful.

Ingredient C

The fatty surfactant should be an at least partially water-soluble surfactant having an HLB number greater than 7 and giving a surface tension less than 50 dynes/cm.$^2$ at 0.2% concentration in water. Polyoxyethylene and polyoxypropylene surfactants are preferred.

The surfactants which are used are of the general formula $$R[(OCH_2CH_2)_nOH]_x$$

and $$R[(OCHCH_3CH_2)_nOH]_x$$

where R is derived from an active hydrogen containing organic group, such as a $C_8$–$C_{26}$ saturated or unsaturated aliphatic alcohol, glycol, polyol, phenol, aromatic alcohol, thiols, amines, etc., $n$ is 2 to 40, and $x$ is 1 to 6. Particularly useful are the BRIJ surfactants which are produced by reaction of 2 to 20 mols of ethylene oxide with one mol of a $C_{12}$–$C_{18}$ saturated or unsaturated aliphatic alcohol. These materials vary from viscous oils up to waxy solids. Other satisfactory surfactants include the fatty acid esters of sorbitan and ethoxylated derivatives thereof. Mixtures of two or more surfactants may be used.

HLB number

In the selection of ingredients (B) and (C) of the coating emulsion, one of the most important characteristics of these components is the HLB (hydrophile-lipophile balance). In the surface chemistry of emulsions, the HLB number is used to characterize the relative simultaneous attraction of an emulsifier for water and for oil. The definition of the HLB number and the calculation or determination thereof for various emulsifiers is set forth in the Encyclopedia of Chemical Technology, Kirk-Othmer, John Wiley and Sons, Inc., vol. 8, second edition, pp. 117–154. In characterizing ingredients (B) and (C), the HLB number is not used for defining the emulsifying characteristics but rather is used merely to define the class of compounds or compositions which are operative in the coating composition. This ingredient (B) must have an HLB number of 1 to 10, while ingredient (C) must have an HLB number greater than about 7.

In carrying out the method of this invention, an aqueous emulsion of the coating composition is prepared and applied as a coating to the ultimate meat-contacting surface of gel cellulosic or other casing (or sheet material from which the casing is to be formed) so that an amount in the range from about 0.01 to 0.2% of the ketene dimer, etc., based on the weight of the casing, is incorporated in the casing. Lesser or greater amounts may be used as desired, although, generally, very slight or very great amounts of the first ingredient of the aqueous emulsion do not materially increase the effectiveness of the treatment and may even decrease it. The casing is heated following the coating step to remove water and accelerate the interaction between the reactive component of the coating and the casing surface. The drying step is preferably sufficient to reduce the moisture content of the casing down to 10% and preferably to 5%.

The coating can be applied to the casing surface in any desired way. Thus, application to conventional regenerated cellulose casing or fibrous casing, or any other kind of casing, can be made by coating the inside surfaces of the tubular casing by a technique which involves the use of a slug of aqueous solution, emulsion, or suspension of the coating composition inside the tube. In this method of coating, the casing moves while the slug of liquid remains still with the result that the inner surface of the casing is wetted and then moves on beyond the slug to a drying atmosphere.

This technique is better illustrated in the following description of the slug coating method as applied to a commercial production line of either regenerated cellulose tubing or casing or paper reinforced regenerated cellulose casing which is known in the trade as fibrous casing.

Figure 1:
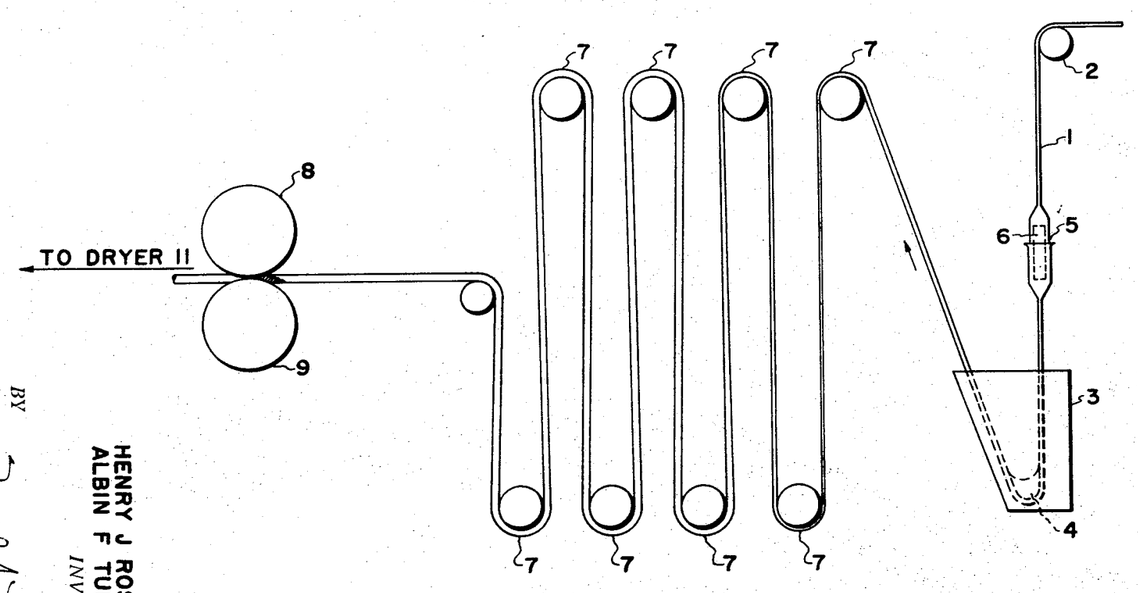

Referring to the drawing, casing which may be wet fibrous casing or wet regenerated cellulose casing 1 in a collapsed flat form is transferred from a bath (not shown) in which the fibrous casing has been washed after being impregnated with viscose followed by regeneration, or in the case of regenerated cellulose casing after regeneration (both of these being well known procedures for the production of fibrous or regenerated cellulose casing), into a slack box 3, by passage over carryover rolls 2. Between the rolls 2 and the slack box 3, an aqueous emulsion of the coating composition containing from 0.01 to 2.5% of each of ingredients (A), (B), and (C), above, is placed within the casing 1, the emulsion being admitted through a cut 5 in the casing 1 before rubber couplers 6 are tied into the casing 1.

The slug 4 of the emulsion lies at the bottom of the slack box 3 and as the casing 1 moves as shown, the interior of the casing 1 is progressively contacted with the slug 4, and is forced open to conform to the configuration of slug 4. Casing 1 then passes over additional rollers 7 which are subjected to a drying atmosphere, air being maintained within the casing 1 as shown, for size control. The casing 1 then passes through idler roll 8 and bull wheel 9 into dryer 11 (not shown) where it is dried further at a temperature of 200° F. for about 5 minutes. In this last drying stage, the ketene dimer (or other hydrophobic reactive coating material) continues and/or completes its interaction with the casing due, presumably, to reaction between the ketene dimer (or other reactive functional group) and the casing surface in contact therewith.

The emulsion is usually modified with a buffer such as sodium bicarbonate. While 0.5% to 2.0% of sodium bicarbonate is a convenient amount and kind of alkaline material used under the particular conditions described, other amounts and kinds of alkaline buffers can be, of course, used, with the desiderata being the obtention of dried casing which is neutral or slightly alkaline. Any well known alkaline buffer which will bring the pH of the coating emulsion to about from 7.7 to 8.0 is useable. The advantage of having the inside of the casing at a slightly alkaline, or a neutral condition, is that reaction of the coating components with cellulose casing is best at this range of pH.

Wet regenerated cellulose casing combing off the production line may have a pH of 6.8 to 7.2. With the pH of the ketene dimer-containing aqueous slug (or other coating emulsion) at 7.8 to 8.0, the pH of the resulting casing, after drying, will range from about 7.6 to 8.2.

If the pH of the wet regenerated cellulose casing is on the alkaline side (e.g. above about pH 8) the ketene dimer emulsion (or other coating emulsion) is reduced correspondingly in pH. Generally, the pH of the coating emulsion is in the range from about 3.0 to 9.0 and is selected so that the pH of the casing, after drying, will be only slightly alkaline.

The drying time and temperature are interdependent factors insofar as effecting the drying of the casing and reaction of the dimer with the casing surface are concerned, as will be apparent to those skilled in the art. Other combinations of time and temperature besides those illustrated above can be used, provided, of course, that the temperature is not so high and time not so long that the casing itself is injured due to weakening, discoloration, embrittlement or the like. For the best results a temperature of about 175° F. or higher should be used.

Under the above described coating and drying conditions, and with the above described types of coating compositions, a number of runs were made, using both fibrous and regenerated cellulose casings as the casing being treated. Various sizes of casing were coated on the inside using the above described application technique and the coating compositions of the following non-limiting examples which are illustrative of this invention. All parts are by weight or weight percent unless otherwise indicated.

EXAMPLE 1

In this eaxmple, the use of an aqueous emulsion or coating composition of a mixture of ketene dimers, cetyl alcohol, a polyoxyethylene ether of cetyl alcohol, and sodium bicarbonate to coat the inside gel cellulosic sausage casing is shown.

An aqueous emulsion was prepared by placing approximately 18 liters of soft water in a mixing tank, heating the water to about 70° C. during agitation with an impeller, stopping the heating and continuing the agitation. 450 grams of BRIJ 56 (polyoxyethylene cetyl ether) and 450 grams of cetyl alcohol are then added, followed by additional mixing for 5 minutes. 450 grams of Aquapel 364 (a mixture of palmitic and stearic ketene dimers) is then added, followed by additional mixing for 5 minutes. 9000 grams of 99% glycerol is then added. Sufficient cold soft water to bring the bath up to 90 liters is then added, followed by addition of 900 grams of sodium bicarbonate. The bath is maintained at 25° C. using slow agitation. The emulsion is ready for use within 24 hours at this temperature.

The above emulsion was applied to both gel fibrous and gel regenerated cellulose casings of various sizes according to the coating and drying technique described above. The inner surface of the casing has a contact angle in the range of 70°–90° wtih respect to water droplets and 40°–70° with respect to oil droplets (vegetable oil, such as cottonseed oil). When the casing is stuffed with sausage emulsion and processed, the casing is easily stripped from the finished sausage without adhesion of meat to the casing and without fatting out or mottling.

EXAMPLE 2

In this example, there is shown the use of various aqueous emulsions of a ketene dimer (including mixtures thereof), a fatty alcohol, a polyoxyalkene ether of a fatty alcohol, and sodium bicarbonate, to coat the inside of gel cellulosic sausage casing.

The following aqueous emulsions (coating compositions) were prepared.

| Coating composition No. | Percent | | | | | | | | | |
|---|---|---|---|---|---|---|---|---|---|---|
| | 1 | 2 | 3 | 4 | 5 | 6 | 7 | 8 | 9 | 10 |
| Ingredients: | | | | | | | | | | |
| Water | 87 | 87 | 87 | 87 | 87 | 87 | 87 | 87 | 87 | 87 |
| Glycerol, 99% | 8 | 8 | 8 | 8 | 8 | 8 | 8 | 8 | 8 | 8 |
| Aquapel 364 | 1 | 1 | 1 | 1 | 1 | 1 | | | 1 | 1 |
| Aquapel 421 | | | | | | | 1 | | | |
| Aquapel 467 | | | | | | | | 1 | | |
| Octyl alcohol | | | | | | | | | 1 | |
| Cetyl alcohol | 1 | 1 | 1 | | | | | 1 | 1 | |
| Lauryl alcohol | | | | 1 | | | | | | |
| Oleyl alcohol | | | | | 1 | | | | | |
| Stearyl alcohol | | | | | | 1 | | | | |
| Sperm wax | | | | | | | | | | 2 |
| BRIJ 56 | 1 | | | 1 | 1 | 1 | 1 | 1 | | |
| BRIJ 76 | | 1 | | | | | | | | |
| BRIJ 78 | | | 1 | | | | | | | |
| Polyoxypropylene (20) octyl ether | | | | | | | | | 1 | |
| Sodium bicarbonate | 2 | 2 | 2 | 2 | 2 | 2 | 2 | 2 | 2 | 2 |

Aquapel is a trademark of Hercules Powder Company, Incorporated, Wilmington, Del. Chemically, Aquapel is an alkylketene dimer prepared from long-chain fatty acids. Palmitic and stearic acids are the principal fatty acids used in the manufacture of Aquapel 364; oleic acid is the principal fatty acid used in the manufacture of Aquapel 421; and myristic and palmitic acids are the principal fatty acids used in the manufacture of Aquapel 467.

Sperm wax is mainly cetyl palmitate and free cetyl alcohol, together with esters of lauric, stearic, and myristic acids. Sperm wax performs the dual function of providing components (B) and (C) in the coating emulsions in which it is used.

BRIJ is a trademark of Atlas Chemical Industries, Inc. (Chemicals Division), Wilmington, Del., for a family of lower alkene oxide ether adducts of fatty alcohols, useful as surfactants.

BRIJ 56 is a polyoxyethylene (10) cetyl ether.
BRIJ 76 is a polyoxyethylene (10) stearyl ether.
BRIJ 78 is a polyoxyethylene (20) stearyl ether.

Each of the coating emulsions No. 1 to No. 10, tabulated above, was applied to both fibrous and regenerated cellulose casings of various sizes according to the coating and drying procedure described with reference to the flow diagram. In each case, the inner surface of the casing has a contact angle in the range of 70°–90° with respect to water droplets and 40°–70° with respect to oil droplets (vegetable oil, such as cottonseed oil). When the casing is stuffed with sausage emulsion and processed, the casing is easily stripped from the finished sausage without adhesion of meat to the casing and without fatting out or mottling.

EXAMPLE 3

In this example there is illustrated the use of an aqueous emulsion of a fatty isocyanate, a faty alcohol, a polyoxyethylene cetyl ether and sodium bicarbonate to coat the inside of casing.

A one percent aqueous emulsion of N-stearyl ethylenimine is prepared as a first emulsion. This first emulsion is used to prepare a final emulsion as follows:

| | Percent |
|---|---|
| 1% N-stearyl ethylenimine emulsion | 30 |
| Stearyl alcohol | 0.8 |
| BRIJ 56 | 0.8 |
| Glycerol, 99% | 5 |
| Cold water | 63.4 |

This coating emulsion is applied to both fibrous and non-fibrous regenerated casings as in the previous examples. The inner surface of the casing has a contact angle in the range of 70°–90° with respect to water droplets and 40°–70° with respect to oil droplets (vegetable oil, such as cottonseed oil). When the casing is stuffed with sausage emulsion and processed, the casing is easily stripped from the finished sausage without adhesion of meat to the casing and without fatting out or mottling.

EXAMPLE 5

In this example, there is shown the use of an aqueous emulsion of a fatty chromium complex, a fatty alcohol and a polyoxyethylene cetyl ether to coat the inside of casing.

A solution of 30% by weight of stearato chromic chloride is diluted with water to 1.0%. This is used to make an emulsion as follows:

| | Percent |
|---|---|
| 1% stearato chloride solution | 50 |
| Stearyl alcohol | 0.5 |
| BRIJ 56 | 0.5 |
| Glycerol, 99% | 4 |
| Cold water | 44 |

Sodium bicarbonate—adjust pH to 3–6 (preferably 4.0).

This coating emulsion is applied to both fibrous and non-fibrous regenerated casings as in the previous examples. The inner surface of the casing has a contact angle in the range of 70°–90° with respect to water droplets and 40°–70° with respect to oil droplets (vegetable oil, such as cottonseed oil). When the casing is stuffed with sausage emulsion and processed, the casing is easily stripped from the finished sausage without adhesion of meat to the casing and without fatting out or mottling.

EXAMPLE 6

In this example, there is shown the use of an aqueous emulsion of a fatty ketene dimer, a fatty amine and a polyoxyethylene cetyl ether to coat the inside of casing.

An aqueous emulsion was made up, as follows:

| | Percent |
|---|---|
| Water | 92 |
| Glycerol, 99% | 6.5 |
| Aquapel 364 | 0.5 |
| Methyl dibehenyl amine | 0.5 |
| BRIJ 56 | 0.5 |

This coating emulsion was applied to both fibrous and non-fibrous regenerated casings as in the previous examples. The coated casing was stuffed with sausage emulsion and processed. The casing stripped easily from the sausage without fatting out or mottling. The inner surface of the casing had a wet-out angle of 70° with respect to water droplets and 42° with respect to cottenseed oil droplets.

EXAMPLE 7

In this example, there is shown the use of an aqueous emulsion of a fatty ketene dimer, a fatty amide and a polyoxyethylene cetyl ether to coat the inside of casing.

An aqueous emulsion was made, as follows:

| | Percent |
|---|---|
| Water | 92 |
| Glycerol, 99% | 6.5 |
| Aquapel 364 | 0.5 |
| Oleyl amide (Armoslip CP) | 0.5 |
| BRIJ 56 | 0.5 |

This coating emulsion was applied to both fibrous and non-fibrous regenerated casings as in the previous examples. The coated casing was stuffed with sausage emulsion and processed. The casing stripped easily from the sausage without fatting out or mottling. The inner surface of the casing had a wet-out angle of 86° with respect to water droplets and 49° with respect to cottonseed oil droplets.

EXAMPLE 8

In this example, there is shown the use of an aqueous emulsion of fatty ketene dimer, a fatty ester and a polyoxyethylene stearyl ether to coat the inside of casing.

An aqueous emulsion is made up, as follows:

| | Percent |
|---|---|
| Water | 90 |
| Glycerol, 99% | 6 |
| Aquapel 364 | 1 |
| 40% acetylated glycerol monostearate | 2 |
| BRIJ 76 | 1 |

This coating emulsion was applied to both fibrous and non-fibrous regenerated casings as in the previous examples. The coated casing was stuffed with sausage emulsion and processed. The casing stripped easily from the sausage without fatting out or mottling. The inner surface of the casing had a wet-out angle of 84° with respect to water droplets and 52° with respect to cottonseed oil droplets.

EXAMPLE 9

In this example, there is illustrated the use of an aqueous emulsion of a ketene dimer, a fatty acid and a polyoxyethylene stearyl ether to coat the inside of casing.

An aqueous emulsion is made, as follows:

| | Percent |
|---|---|
| Water | 90 |
| Glycerol, 99% | 6 |
| Aquapel 364 | 1 |
| Arachidic acid | 2 |
| BRIJ 78 | 1 |

This coating emulsion is applied to both fibrous and non-fibrous regenerated casings as in the previous examples. The inner surface of the casing has a contact angle in the range of 70°–90° with respect to water droplets and 40°–70° with respect to oil droplets (vegetable oil, such as cottonseed oil). When the casing is stuffed with sausage emulsion and processed, the casing is easily stripped from the finished sausage without adhesion of meat to the casing and without fatting out or mottling.

Evaluation of coated casings

The non-fibrous regenerated cellulose casings produced in Examples 1–9 were stuffed out to produce spice luncheon loaf and the fibrous casings were stuffed out to produce various types of bolognas. Of course, these casings may be used in the manufacture of other types of sausage or comminuted meat products.

The adhesion of the casings treated in accordance with this invention is measured using a Model Serial No. 325 Dillon tester or by stripping the casing from the sausage and inspecting it for the adherence of meat thereon. The tendency of the encased sausages toward fatting out and mottling is evaluated by visual inspection of the casings subsequent to peeling the casings from the sausages.

The effectiveness of the casings coated in accordance with this invention is evaluated by comparing casings treated in accordance with this invention with various sets of controls prepared according to the prior art. In general, it was found that casings prepared in accordance with this invention peeled readily from sausages without adhesion of the meat thereto and exhibited no fatting out or mottling. Casings coated with a composition in which ingredient (B) was omitted generally peeled satisfactorily but exhibited fatting out and/or mottling.

This method has been used commercially in the treatment of both heavy gauge large size cellulose casings and fibrous casings used in the packaging of large sausages. The performance of these casings was compared with casings which had been treated commercially using prior art techniques. In evaluating this method, it was necessary to determine its effectiveness on hundreds of sausage casings to determine whether or not it would be satisfactory for commercial use. However, water contact angle and oil contact angle measurements were taken which correlate well with actual performance. On the basis of the correlation of these measurements with field performance, it was concluded that mottling usually results from an oil contact angle of less than 30° and fatting out from an oil contact angle greater than 70°. A water contact angle of 70°–90° is necessary in a casing which peels satisfactorily.

While the process for applying coating to the inside surfaces of casings is described with special emphasis on the treatment of a preformed casing, it should be understood that the coating can also be applied to the surface or surfaces of cellulosic sheets themselves before they are formed into tubes. For example, sheets of regenerated cellulose impregnated fibrous sheeting can be treated in accordance with the present invention by applying to the surface thereof the coating from a solution, suspension or emulsion in amount sufficient to uniformly coat the surface. After such treatment, the sheeting can be formed into a tube by any conventional technique.

It is seen from the above that the technique of the present invention results in the production of highly and unexpectedly superior fibrous and other casings with respect to the performance characteristics of such casings when used as containers for sausage items which are designed for pre-sliced packaging. The application is simple and lends itself to easy adaptation within the well known commercial fabrication of fibrous casing; it involves the use of extremely small amounts of materials which are relatively easy to apply and which are surprisingly effective for the purpose of this invention, and which do not adversely effect desirable permeability characteristics of the casing with respect to moisture vapor, smoke, dyeing and the like. As described above, the coating is effective to facilitate easy peeling of casing from sausages and to completely eliminate the problems of fatting out and mottling of the sausage which was a serious problem for sausage casings prepared in accordance with any of the prior art techniques.

While the applicability of this invention has been described with particular reference to the treatment of regenerated cellulose and fibrous casings, it will be seen that it is also applicable to coating the inside surfaces of such products as regenerated cellulose casing and fibrous casing whose outside surfaces are coated with Saran, casings coated on the outside with polymer compositions such as the casings described in U.S. Pat. No. 2,812,259 to Arthur Mark, U.S. Pats. Nos. 2,627,471 and 2,627,483 to Laurence E. Dowd, Naturine Casings, Fibrous Alginate Casings, and the Like.

While this invention has been described fully and completely with special emphasis upon several preferred embodiments, it should be understood that within the spirit and scope of the appended claims this invention may be practiced otherwise than as specifically described herein.

We claim:
1. A method of treating an artificial sausage casing to prevent adhesion of sausage to the casing and to prevent mottling and fatting out of sausages encased therein, which comprises
   contacting the meat-contacting surface of said casing, prior to stuffing, with an aqueous emulsion comprising:
   (A) a fatty material having a functional group reactive with the casing surface to adhere thereto,
   (B) a water-insoluble, monomeric fatty material with a polar end group, said fatty material having an HLB number from about 1 to about 10, and
   (C) an at least partially water-soluble fatty surfactant having an HLB number greater than about 7 and giving a surface tension less than about 50 dynes/cm.² at 0.2% concentration in water, components (A), (B), and (C) being proportioned to form a coating on said meat-contacting surface adhered at least partially by reaction of emulsion component (A) with said surface which when dried has a wet out angle of about 70–90° for water droplets and about 40–70° for vegetable oil droplets, and drying the coated meat-contacting surface.

2. A method in accordance with claim 1 in which said casing is a fibrous or non-fibrous cellulosic casing.

3. A method in accordance with claim 2 in which emulsion component (A) is a fatty ketene dimer, fatty isocyanate, N-fatty ethylenimine, or fatty metal complex.

4. A method in accordance with claim 3 in which the fatty substituent is derived from a $C_6$–$C_{26}$ fatty acid.

5. A method in accordance with claim 2 in which emulsion component (B) is a fatty alcohol, fatty amine, fatty amide, fatty acid or fatty ester.

6. A method in accordance with claim 5 in which the fatty substituent is derived from a $C_6$–$C_{26}$ fatty acid.

7. A method in accordance with claim 2 in which emulsion component (C) is a polyoxyethylene or polyoxypropylene derivative of an active-hydrogen-containing organic compound.

8. A method in accordance with claim 7 in which component (C) is derived from a $C_6$–$C_{26}$ fatty organic compound.

9. A method in accordance with claim 2 in which said coating emulsion comprises a fatty ketene dimer, cetyl alcohol, and a polyoxyethylene cetyl ether.

10. In the production of sausage wherein sausage emulsion is stuffed into a sausage casing, the improvement which comprises contacting the meat-contacting surface of said casing, prior to stuffing, with an aqueous emulsion comprising:
(A) a fatty material having a functional group reactive with the casing to adhere thereto,
(B) a water-insoluble, monomeric fatty material with a polar end group, said fatty material having an HLB number from about 1 to about 10, and
(C) an at least partially water-soluble surfactant having an HLB number greater than about 7 and giving a surface tension less than about 50 dynes/cm.² at 0.2% concentration in water, components (A), (B), and (C) being proportioned to form a coating on said meat-contacting surface adhered at least partially by reaction of emulsion component (A) with said surface which when dried has a wet out angle of about 70–90° for water droplets and about 40–70° for vegetable oil droplets, and drying the coated meat-contacting surface.

11. A meat casing having the meat-contacting surface thereof coated with a mixture of
(A) a fatty material having a functional group reactive with the casing surface to adhere thereto,
(B) a water-insoluble, monomeric fatty material with a polar end group, said fatty material having an HLB number from about 1 to about 10, and
(C) an at least partially water-soluble fatty surfactant having an HLB number greater than about 7 and giving a surface tension less than about 50 dynes/cm.² at 0.2% concentration in water, components (A), (B), and (C) being proportioned to provide a coating having a wet out angle of about 70–90° for water droplets and about 40–70° for vegetable oil droplets, whereby the casing is easily stripped from sausages encased therein without adhesion of meat thereto and without fatting out or mottling.

12. A casing in accordance with claim 11 in which coating component (A) is a fatty ketene dimer, fatty isocyanate, N-fatty-ethylenimine, or fatty metal complex.

13. A casing in accordance with claim 11 in which coating component (B) is a fatty alcohol, fatty amine, fatty amide, fatty acid or fatty ester.

14. A casing in accordance with claim 11 in which coating component (C) is a polyoxyethylene or polyoxypropylene derivative of an active-hydrogen-containing organic compound.

15. A casing in accordance with claim 11 in which coating components (A), (B) and (C) are present on the casing in a concentration of about 0.01–0.2% by weight of the casing.

16. A coating composition comprising an aqueous emulsion of:
(A) a fatty ketene dimer, fatty isocyanate, N-fatty-ethylenimine or fatty chromium complex,
(B) a water-insoluble, monomeric fatty material with a polar end group and having an HLB number from about 1 to about 10, and
(C) an at least partially water-soluble fatty surfactant having an HLB number greater than about 7 and giving a surface tension less than about 50 dynes/cm.² at 0.2% concentration in water, components (A), (B), and (C) being proportioned so that a coating produced from said composition has a wet out angle of about 70–90° for water droplets and about 40–70° for vegetable oil droplets.

17. A coating composition in accordance with claim 16 in which component (B) is a fatty alcohol, fatty amine, fatty amide, fatty acid or fatty ester, and component (C) is a polyoxyethylene or polyoxypropylene ether of a fatty alcohol.

References Cited

UNITED STATES PATENTS

| | | | |
|---|---|---|---|
| 2,627,477 | 2/1953 | Downey | 99—176X |
| 2,709,138 | 5/1955 | Weingand | 99—174X |
| 2,901,358 | 8/1959 | Underwood | 99—176 |
| 2,901,371 | 8/1959 | Arlt | 106—243 |
| 3,224,885 | 12/1965 | Shiner | 99—176 |
| 3,311,532 | 3/1967 | Kulick | 106—170X |

FOREIGN PATENTS

| | | | |
|---|---|---|---|
| 186,116 | 9/1955 | Austria | 99—176 |

FRANK W. LUTTER, Primary Examiner

R. HALPER, Assistant Examiner

U.S. Cl. X.R.

106—243, 244

UNITED STATES PATENT OFFICE
Certificate of Correction

Patent No. 3,582,364                                                June 1, 1971

Henry J. Rose et al.

It is certified that error appears in the above-identified patent and that said Letters Patent are hereby corrected as shown below:

In the grant (only), cancel the second page containing columns 9, 10, 11 and 12, and insert after column 4, the page containing columns, 5, 6, 7 and 8.

surfactant having an HLB number greater than 7 and giving a surface tension less than 50 dynes/cm.² at 0.2% concentration in water, e.g. a polyoxyethylene or polyoxypropylene type surfactant. In (A), (B) and (C), the fatty substituents are preferably of about the same chain length. The three ingredients of the coating composition are nontoxic. The three ingredients of the emulsion are usually modified with a buffer such as sodium bicarbonate to adjust and maintain the pH and are so proportioned and chosen such that the contact angle for droplets of water on the inner surface of the casing is about 70°–90° (preferably 80°–90°) and the contact angle for oil droplets is about 40°–70° (preferably 40°–60°).

INGREDIENTS OF COATING COMPOSITION

The coating composition set forth above contains (A) a hydrophobic material, (B) a water-insoluble, monomeric fatty material with a polar end group and having an HLB number from 1 to 10, and (C) an at least partially water-soluble surfactant having an HLB number greater than 7 and giving a surface tension less than 50 dynes/cm.² at 0.2% concentration in water, buffered to a pH of 3–9 suitable for stability of ingredient (A) (e.g. about pH 6–9 for a ketene dimer, fatty isocyanate, or fatty imine, or pH 3–6 for a fatty chromium complex).

Ingredient A

The hydrophobic material may be a dimer of a fatty ketene, a fatty isocyanate, an N-fatty-imine or fatty chromium (or similar metal) complex, having a reactive functional group capable of reacting with and adhering to the surface of the casing.

The ketenes which are preferably used in the aqueous emulsion are diketenes of the empirical formula where R' and R'' are selected from the group consisting of hydrogen and $C_8$–$C_{26}$ alkyl, aryl, and cycloalkyl radicals, not more than one of the groups R' and R'' being hydrogen. These ketenes are generally prepared from naturally occurring fatty acids, and the total number of carbon atoms and subsidiary groups corresponds to the skeleton of the acid from which the ketene was derived. In general, it is preferred to use ketenes (diketenes) which are solid at ordinary temperatures. Greatly preferred are diketenes where R' is $C_{12}$–$C_{18}$. Such compounds and their production are described further in detail in U.S. Pat. 2,762,270, and emulsions of said ketenes are described in U.S. Pat. 2,856,310. In particular, hexyl ketene dimer, decyl ketene dimer, hexadecyl ketene dimer, hexadecenyl ketene, a fatty isocyanate, an N-fatty-imine or fatty chrodimer, octadecyl ketene dimer, dimers of mixtures of ketenes obtainable from fats, oils, and the like, as well as dimers of monomeric, monoalkyl, and monoaryl ketenes, dialkyl ketenes, diaryl ketenes, cycloalkyl ketenes, and dicycloalkyl ketenes, and the like, including, for example, phenyl ketene, dioctyl ketene, tolyl ketene, decyl phenyl ketene, cyclohexyl ketene, benzyl ketene, and their dimers may be employed.

Commercially available ketenes which are especially useful in the coating of sausage casings are diketenes sold under the trademark Aquapel which are alkyl ketene dimers or mixtures thereof.

Hydrophobic materials other than a dimer of a fatty ketene which combine chemically or absorptively with the interior wall of the sausage casing may also be employed instead of the ketene dimer in the aqueous coating emulsion. Substances particularly useful for this purpose are those which render the interior wall of the casing hydrophobic to the desired degree. Especially advantageous are isocyanates or ethylenimines containing a hydrophobic radical such as a fatty acid residue. Stearyl isocyanate and N-stearyl-ethylenimine are greatly preferred although, in general, fatty isocyanates and N-fatty-ethylenimines derived from $C_8$–$C_{26}$ fatty acids, preferably $C_{12}$–$C_{18}$ fatty acids, may be employed.

Still other substances especially advantageous for use in place of a dimer of a higher ketene are water-soluble fatty chromium Werner complexes such as stearato chromic chloride. In general, any fatty chromium complex, preferably a fatty chromium chloride complex, derived from $C_8$–$C_{26}$ fatty acids, preferably $C_{12}$–$C_{18}$ fatty acids, may be employed. However, the stearato chromic chloride version is greatly preferred. If desired, aluminum, copper or zirconium Werner complexes may be employed instead of chromium Werner complexes.

Ingredient B

The water-insoluble, monomeric fatty material with a polar end group and having an HLB number from 1 to 10 may be a fatty alcohol, fatty amine, fatty amide, fatty acid, fatty ester, etc., the fatty substituent ranging from $C_8$–$C_{26}$, preferably $C_{12}$–$C_{18}$.

Fatty alcohols useful in the method of this invention include $C_8$–$C_{12}$, preferably $C_{12}$–$C_{18}$, alcohols. Cetyl alcohol is preferred. It has a melting point of 49.6° C. and is molten during the drying of the coating.

Fatty amines which can be used include those of the formula $R^1NR^2R^3$, where $R^1$ is a $C_8$–$C_{26}$ saturated or unsaturated aliphatic group, and $R^2$ and $R^3$ are hydrogen or $C_1$–$C_{26}$ hydrocarbon groups. Satisfactory amines are those with an HLB number of 1 to 10.

Fatty acids and amides which may be used include $C_8$–$C_{26}$ fatty acids and fatty amides, either straight chain or branched chain, saturated or unsaturated. The acids and amides, which are satisfactory have an HLB number of 1 to 10.

Fatty esters may be used in which the fatty substituent, $C_8$–$C_{26}$ aliphatic, is present in either portion of the molecule. Esters of the formula $R^1COOR^2$, where at least one of the groups $R^1$ and $R^2$ is $C_8$–$C_{26}$ aliphatic, and having an HLB number of 1 to 10, may be used. Partial fatty esters of glycerol and acetylated fatty esters of glycerol, sold commercially as the Myverols and Myvacets, respectively, are particularly useful.

Ingredient C

The fatty surfactant should be an at least partially water-soluble surfactant having an HLB number greater than 7 and giving a surface tension less than 50 dynes/cm.² at 0.2% concentration in water. Polyoxyethylene and polyoxypropylene surfactants are preferred.

The surfactants which are used are of the general formula and where R is derived from an active hydrogen containing organic group, such as a $C_8$–$C_{26}$ saturated or unsaturated aliphatic alcohol, glycol, polyol, phenol, aromatic alcohol, thiols, amines, etc., n is 2 to 40, and x is 1 to 6. Particularly useful are the BRIJ surfactants which are produced by reaction of 2 to 20 mols of ethylene oxide with one mol of a $C_{12}$–$C_{18}$ saturated or unsaturated aliphatic alcohol. These materials vary from viscous oils up to waxy solids. Other satisfactory surfactants include the fatty acid esters of sorbitan and ethoxylated derivatives thereof. Mixtures of two or more surfactants may be used.

HLB number

In the selection of ingredients (B) and (C) of the coating emulsion, one of the most important characteristics of these components is the HLB (hydrophile-lipophile balance). In the surface chemistry of emulsions, the HLB number is used to characterized the relative simultaneous attraction of an emulsifier for water and for oil. The definition of the HLB number and the calculation or determination thereof for various emulsifiers is set forth in the Encyclopedia of Chemical Technology, Kirk-Othmer, John Wiley and Sons, Inc., vol. 8, second edition, pp. 117–154. In characterizing ingredients (B) and (C), the HLB number is not used for defining the emulsifying characteristics but rather is used merely to define the class of compounds or compositions which are operative in the coating composition. This ingredient (B) must have an HLB number of 1 to 10, while ingredient (C) must have an HLB number greater than about 7.

In carrying out the method of this invention, an aqueous emulsion of the coating composition is prepared and applied as a coating to the ultimate meat-contacting surface of gel cellulosic or other casing (or sheet material from which the casing is to be formed) so that an amount in the range from about 0.01 to 0.2% of the ketene dimer, etc., based on the weight of the casing, is incorporated in the casing. Lesser or greater amounts may be used as desired, although, generally, very slight or very great amounts of the first ingredient of the aqueous emulsion do not materially increase the effectiveness of the treatment and may even decrease it. The casing is heated following the coating step to remove water and accelerate the interaction between the reactive component of the coating and the casing surface. The drying step is preferably sufficient to reduce the moisture content of the casing down to 10% and preferably to 5%.

The coating can be applied to the casing surface in any desired way. Thus, application to conventional regenerated cellulose casing or fibrous casing, or any other kind of casing, can be made by coating the inside surfaces of the tubular casing by a technique which involves the use of a slug of aqueous solution, emulsion, or suspension of the coating composition inside the tube. In this method of coating, the casing moves while the slug of liquid remains still with the result that the inner surface of the casing is wetted and then moves on beyond the slug to a drying atmosphere.

This technique is better illustrated in the following description of the slug coating method as applied to a commercial production line of either regenerated cellulose tubing or casing or paper reinforced regenerated cellulose casing which is known in the trade as fibrous casing.

Referring to the drawing, casing which may be wet fibrous casing or wet regenerated cellulose casing 1 in a collapsed flat form is transferred from a bath (not shown) in which the fibrous casing has been washed after being impregnated with viscose followed by regeneration, or in the case of regenerated cellulose casing after regeneration (both of these being well known procedures for the production of fibrous or regenerated cellulose casing), into a slack box 3. by passage over carry-over rolls 2. Between the rolls 2 and the slack box 3, an aqueous emulsion of the coating composition containing from 0.01 to 2.5% of each of ingredients (A), (B), and (C), above, is placed within the casing 1, the emulsion being admitted through a cut 5 in the casing 1 before rubber couplers 6 are tied into the casing 1.

The slug 4 of the emulsion lies at the bottom of the slack box 3 and as the casing 1 moves as shown, the interior of the casing 1 is progressively contacted with the slug 4, and is forced open to conform to the configuration of slug 4. Casing 1 then passes over additional rollers 7 which are subjected to a drying atmosphere, air being maintained within the casing 1 as shown, for size control. The casing 1 then passes through idler roll 8 and bull wheel 9 into dryer 11 (not shown) where it is dried further at a temperature of 200° F. for about 5 minutes. In this last drying stage, the ketene dimer (or other hydrophobic reactive coating material) continues and/or completes its interaction with the casing due, presumably, to reaction between the ketene dimer (or other reactive functional group) and the casing surface in contact therewith.

The emulsion is usually modified with a buffer such as sodium bicarbonate. While 0.5% to 2.0% of sodium bicarbonate is a convenient amount and kind of alkaline material used under the particular conditions described, other amounts and kinds of alkaline buffers can be, of course, used, with the desiderata being the obtention of dried casing which is neutral or slightly alkaline. Any well known alkaline buffer which will bring the pH of the coating emulsion to about from 7.7 to 8.0 is useable. The advantage of having the inside of the casing at a slightly alkaline, or a neutral condition, is that reaction of the coating components with cellulose casing is best at this range of pH.

Wet regenerated cellulose casing combing off the production line may have a pH of 6.8 to 7.2. With the pH of the ketene dimer-containing aqueous slug (or other coating emulsion) at 7.8 to 8.0, the pH of the resulting casing, after drying will range from about 7.6 to 8.2.

If the pH of the wet regenerated cellulose casing is on the alkaline side (e.g. above about pH 8) the ketene dimer emulsion (or other coating emulsion) is reduced correspondingly in pH. Generally, the pH of the coating emulsion is in the range from about 3.0 to 9.0 and is selected so that the pH of the casing, after drying, will be only slightly alkaline.

The drying time and temperature are interdependent factors insofar as effecting the drying of the casing and reaction of the dimer with the casing surface are concerned, as will be apparent to those skilled in the art. Other combinations of time and temperature besides those illustrated above can be used, provided, of course, that the temperature is not so high and time not so long that the casing itself is injured due to weakening, discoloration, embrittlement or the like. For the best results a temperature of about 175° F. or higher should be used.

Under the above described coating and drying conditions, and with the above described types of coating compositions, a number of runs were made, using both fibrous and regenerated cellulose casings as the casing being treated. Various sizes of casing were coated on the inside using the above described application technique and the coating compositions of the following non-limiting examples which are illustrative of this invention. All parts are by weight or weight percent unless otherwise indicated.

EXAMPLE 1

In this example, the use of an aqueous emulsion or coating composition of a mixture of ketene dimers, cetyl alcohol, a polyoxyethylene ether of cetyl alcohol, and sodium bicarbonate to coat the inside gel cellulosic sausage casing is shown.

An aqueous emulsion was prepared by placing approximately 18 liters of soft water in a mixing tank, heating the water to about 70° C. during agitation with an impeller, stopping the heating and continuing the agitation. 450 grams of BRIJ 56 (polyoxyethylene cetyl ether) and 450 grams of cetyl alcohol are then added, followed by additional mixing for 5 minutes. 450 grams of Aquapel 364 (a mixture of palmitic and stearic ketene dimers) is then added, followed by additional mixing for 5 minutes. 9000 grams of 99% glycerol is then added. Sufficient cold soft water to bring the bath up to 90 liters is then added, followed by addition of 900 grams of sodium bicarbonate. The bath is maintained at 25° C. using slow agitation. The emulsion is ready for use within 24 hours at this temperature.

The above emulsion was applied to both gel fibrous and gel regenerated cellulose casings of various sizes according to the coating and drying technique described above. The inner surface of the casing has a contact angle in the range of 70°–90° with respect to water droplets and 40°–70° with respect to oil droplets (vegetable oil, such as cottonseed oil). When the casing is stuffed with sausage emulsion and processed, the casing is easily stripped from the finished sausage without adhesion of meat to the casing and without fatting out or mottling.

Signed and sealed this 30th day of May 1972.

[SEAL]

Attest:

EDWARD M. FLETCHER, JR.
*Attesting Officer.*

ROBERT GOTTSCHALK
*Commissioner of Patents.*